United States Patent
Riddiford et al.

(10) Patent No.: US 9,573,532 B2
(45) Date of Patent: Feb. 21, 2017

(54) MOBILE DEVICE DOCKING STATION

(71) Applicant: TomTom International B.V., Amsterdam (NL)

(72) Inventors: Martin Riddiford, London (GB); Benjamin John Henley, London (GB)

(73) Assignee: TomTom International B.V., Amsterdam (NL)

( * ) Notice: Subject to any disclaimer, the term of this patent is extended or adjusted under 35 U.S.C. 154(b) by 62 days.

(21) Appl. No.: 14/385,810

(22) PCT Filed: Mar. 29, 2013

(86) PCT No.: PCT/EP2013/056833
§ 371 (c)(1),
(2) Date: Sep. 17, 2014

(87) PCT Pub. No.: WO2013/144351
PCT Pub. Date: Oct. 3, 2013

(65) Prior Publication Data
US 2015/0072555 A1     Mar. 12, 2015

(30) Foreign Application Priority Data

Mar. 30, 2012  (GB) .................................. 1205807.9

(51) Int. Cl.
*H04M 1/00* (2006.01)
*B60R 11/02* (2006.01)
(Continued)

(52) U.S. Cl.
CPC ............ *B60R 11/0241* (2013.01); *F16B 2/10* (2013.01); *F16B 2/12* (2013.01); *F16M 11/041* (2013.01);
(Continued)

(58) Field of Classification Search
CPC .... H04M 1/04; H04M 1/6083; F16M 11/041; F16M 11/14; F16M 13/022; F16B 2/10; F16B 2/12; B60R 11/0241
(Continued)

(56) References Cited

U.S. PATENT DOCUMENTS 5,457,745 A * 10/1995 Wang .................. B60R 11/0241
                                                              379/426
5,903,645 A *  5/1999 Tsay .................... B60R 11/0241
                                                              248/316.4
(Continued)

FOREIGN PATENT DOCUMENTS

DE    202011052313 U1    1/2012
JP         3173277 U     2/2012
WO    2012137007 A1     10/2012

OTHER PUBLICATIONS

Search Report issued Jul. 12, 2012 for United Kingdom Patent Application No. GB1205807.9.
(Continued)

*Primary Examiner* — Todd M Epps

(57) ABSTRACT

A docking station (10) for an elongate rectangular mobile device. A first adjustable slide clamp member (14) is fitted in aperture (28) and is capable of adjustment in one direction. A second adjustable rotate clamp member (16) has a plug (85) for interconnection with a socket of the mobile device. The slide clamp member (14) has a clamp surface (32) and comprises a ratchet arm (26). The rotate clamp member also has a clamp surface (32c) and is rotatably disposed with respect to the body so that it can rotate between two positions. In a first position the clamp surface is perpendicular to the direction of movement of the slide clamp (14). In a second position it is parallel to that direction. In the second position, it opens a second aperture
(Continued)

opposite the rotate clamp member and in which the slide clamp member can be inserted.

20 Claims, 6 Drawing Sheets

(51) Int. Cl.
| | |
|---|---|
| *F16M 11/04* | (2006.01) |
| *F16M 11/14* | (2006.01) |
| *F16M 13/02* | (2006.01) |
| *H04M 1/04* | (2006.01) |
| *F16B 2/10* | (2006.01) |
| *F16B 2/12* | (2006.01) |
| *H01R 33/945* | (2006.01) |
| *H04M 1/60* | (2006.01) |
| *B60R 11/00* | (2006.01) |

(52) U.S. Cl.
CPC .......... *F16M 11/14* (2013.01); *F16M 13/022* (2013.01); *H01R 33/945* (2013.01); *H04M 1/04* (2013.01); *B60R 2011/0071* (2013.01); *H04M 1/6083* (2013.01)

(58) Field of Classification Search
USPC .......... 248/229.12; 455/575.1; 379/454, 455; 361/679.56; 343/878
See application file for complete search history.

(56) References Cited

U.S. PATENT DOCUMENTS

| | | | |
|---|---|---|---|
| 6,366,672 | B1 | 4/2002 | Tsay |
| 6,785,567 | B2 | 8/2004 | Kato |
| 7,158,092 | B2 | 1/2007 | Shen |
| 7,967,269 | B2 * | 6/2011 | Liu .................. G03B 21/58 248/176.3 |
| 8,136,780 | B2 * | 3/2012 | Lin .................. F16M 11/28 248/316.4 |
| 8,833,716 | B2 * | 9/2014 | Funk ................ F16M 13/02 248/309.1 |
| 9,097,380 | B2 * | 8/2015 | Wheeler ............ A47F 7/024 |
| 9,103,487 | B2 * | 8/2015 | Hale ................ F16M 13/022 |
| 2003/0083115 | A1 | 5/2003 | Kato |
| 2006/0183511 | A1 | 8/2006 | Shen |
| 2007/0262223 | A1 * | 11/2007 | Wang .............. B60R 11/0241 248/346.07 |
| 2010/0065704 | A1 | 3/2010 | Liu |

OTHER PUBLICATIONS

International Search Report issued Jul. 10, 2013 for International Application No. PCT/EP2013/056833.

\* cited by examiner

MOBILE DEVICE DOCKING STATION

CROSS-REFERENCES TO RELATED APPLICATIONS

This application is the National Stage of International Application No. PCT/EP2013/056833, filed on Mar. 29, 2013 and designating the United States. The application claims the benefit of United Kingdom Patent Application no. 1205807.9 filed Mar. 30, 2012. The entire contents of both these applications are incorporated herein by reference.

This invention relates to a docking station for a mobile device, especially a mobile phone. Docking stations can be used to locate a mobile phone for hands-free use in a vehicle, for example.

BACKGROUND

Many vehicle docking stations are available on the market. They are frequently employed to enable a mobile phone to be used in a manner that does not infringe the law in some countries, where it may be forbidden to hold a mobile phone in the hand and make telephone calls or use it for other applications. It is straightforward to design a station that is bespoke for a particular phone and many phone manufacturers do supply their own such stations. Equally there are a range of third party manufacturers who make docking stations. The stations they make fall into two categories: those designed for one or a particular range of phones; and those designed to be used by multiple different phones. In the case of the latter, there is inevitably a balance to be struck between a station that is difficult to operate, susceptible to damage, and not attractive; and one that simply does not fit many phones, even although it can be made robust, yet attractive and fit for purpose. The reason a station that fits many phones has the aforementioned disadvantages is because phones come in different shapes and sizes and need to be gripped in different planes to avoid clamping mechanisms from fouling or obstructing certain buttons or sockets that are located in different places around the phone. This means they need to have many capabilities and be very flexible to operate in different modes. That makes them generally susceptible to damage, and generally unattractive.

Docking stations usually have two kinds of base, a sucker or pad, for connection to a vehicle dashboard or windscreen, or a clip mechanism, for attachment to a ventilator grill. Many docking stations have the capacity to be switched between dash mounting and grill mounting. For example, the station may be supplied with the two kinds of mount either of which may be clipped or otherwise secured to the station.

Docking stations can have different functionalities. A most basic form simply grips and holds a phone that still has to be operated, either remotely through voice-activation, or by direct pushing of phone buttons. Another form at least has a charging port and is provided with means to connect to a vehicle electrical supply, for example, the cigar lighter port that most vehicles have. This still requires physical interaction by the user. More sophisticated docking stations have speakers and microphones and a connection for the phone whereby true hands-free voice-activation operation may be implemented. In these cases, the docking station requires a plug to engage the appropriate socket of the phone.

Nowadays, phones tend to fall in two camps: Apple Inc's iPhone® family of phones that has its own bespoke socket, and others that use a micro uUSB port connection. Any of a multiple variety of interfaces are possible and of course older phones are particularly variable. However, presently, phones tend to be gravitating to one of the two types of interface just mentioned.

These interfaces provide not only power interchange, useful for charging phone batteries, but also can be used for data exchange including voice control from the phone. However, most phones also provide Bluetooth® radio interconnectivity and therefore so also do some docking stations. However, a battery charging interface of a docking station is nevertheless still desirable, even if Bluetooth®, is used as the means of intercommunication.

It is an object of the present invention to provide a docking station, primarily but not exclusively for use in a vehicle, that can accommodate a wide range of phones, and yet is potentially robust and reliable.

BRIEF SUMMARY OF THE DISCLOSURE

In accordance with the present invention there is provided a docking station for a mobile device comprising a main body providing a generally flat base and against which base a mobile device is adapted to lie, in use, and two adjustable clamp members arranged to be capable of being moved towards and away from one another between open and closed positions, to squeeze and release from between them a mobile device to be docked in the station, wherein the clamp members are adapted to be positioned in one of at least two orientations with respect to the base, in a first orientation the clamp members moving between said open and closed positions in a first direction substantially parallel said base and a second orientation wherein the clamp members move between said open and closed positions in a second direction substantially parallel said base and substantially perpendicular said first direction.

The mobile device primarily intended to be docked is a mobile (cellular) phone, in particular one that is substantially rectangular in outline and having a socket for reception of a power (and other communication) cable plug either in a base edge or in a side edge of the phone. However, other devices such as satellite navigation devices, or music devices of similar shape and dimensions may be docked. Preferably, said base is substantially rectangular in outline and indeed of similar size to common dimensions of currently manufactured phones. These have dimensions in the order of 60×120 mm, but can vary, typically between 54 and 66 mm width and 99 and 128 mm length. Preferably, the base is between 95 and 105 mm in length by between 45 and 55 mm in width, more preferably, between 97 to 101 mm by 50 to 54 mm in width. Then, if the phone can be seated reasonably squarely on the base (and this depends to some extent on the clamps) the base can be hidden from view behind the phone, and all that is visible to a large extent are the clamp members gripping the sides of the phone.

Thus, said rectangular base may have two short sides and two long sides and said first direction may be substantially parallel one of said long sides.

The clamp members may have a width less than the width of the base and, when moving in said first direction, the clamp members may be within the confines of the long sides of the base. By this is meant that the widths of the clamp members are less than the width of the base. In this event, the clamp members, when moving in said second direction, are arranged to be nearer one short side of the base than the other. If one of the clamp surfaces includes a plug for mating with a socket on a mobile device to be docked on the station, then having the clamp members offset with respect to the centre line (at least on the long side) is more likely to have the phone (in the case of phones) appropriately (that is, squarely) oriented with respect to the base, since, although this is infinitely variable in principle, the position of sockets in most mobile phones, when disposed in their long sides, tends to be offset from a centre line.

In an embodiment, at least one clamp member is a rotate clamp member, has a clamp surface and is rotatably disposed with respect to the body so that it can rotate between two positions, in a first of which the clamp surface is parallel said second direction and in a second of which it is parallel said first direction.

In this case: the base may comprise a front wall, a back wall, and a hub disposed between said front and back walls; said rotate clamp member may have a sleeve surrounding said hub and may be rotatable thereon; and an arm of the rotate clamp member may extend from said sleeve between said front and rear walls and on the end of which arm said clamp surface may be disposed. Conveniently, an edge wall is formed between said front and back walls to close the body, the sleeve forming said edge wall between said two positions and conforming to the profile of said front and back walls when in either of said two positions.

In an embodiment, one clamp member is a slide clamp member, has a clamp surface and comprises a ratchet arm on the end of which is disposed said clamp surface, and wherein the body comprises first and second apertures, each of which apertures is adapted to receive said ratchet arm to permit sliding movement of said slide clamp member, in the first aperture in said first direction and in said second aperture in said second direction, said clamp surface being substantially perpendicular the direction of sliding movement of the slide clamp member.

Here, the base may comprise a front wall, a back wall, and means defining a slot associated with each aperture to receive said ratchet arm, which slot may be provided with serrations against which said ratchet arm latches to lock the slide clamp member against retraction from said aperture in any of multiple positions between a first extreme when said clamp members have maximal separation and a second extreme when said clamp members have minimal separation. The term "ratchet arm" implies, but does not require, discrete "ratcheting" movement of the arm. In fact, smooth, analogue movement is perfectly feasible.

Conveniently, said ratchet arm comprises a spring-biased knob which, when depressed, releases the latch of the ratchet arm with said serrations to permit free sliding of the ratchet arm in said slot.

Preferably, one clamp member is fixed with respect to said first and second directions. This means that only the other clamp member is adjusted to close the clamp about the phone.

Preferably, one clamp member is a slide clamp member as defined above and the other is a rotate clamp member. In this case, it is the rotate clamp member that is fixed with respect to said first and second directions. (There is nothing to prevent a rotate clamp member from also providing a sliding feature to enable it also to extend its clamp surface towards and away from a phone to be docked.)

In an embodiment as just defined, the slot associated with at least one aperture is defined at least in part through the hub, the sleeve of the rotate clamp member having an aperture on the side thereof opposite the arm and through which the ratchet arm of the slide member is adapted to slide when the rotate arm is in said first position.

Said rotate clamp member may have a third position in which the clamp surface is parallel said first direction and on the opposite side of the base from the first position. Moreover, said body may be provided with a third aperture on the other side of the body from said first aperture and also be adapted to receive said ratchet arm to permit sliding movement of said slide clamp member in said first direction. This means that the socket of the mobile phone can be on either side of the phone and the plug (when it is on the rotate clamp member) can thus be arranged to engage the socket on whichever side it is presented. The slots associated with said first and third apertures may be collinear and each at least in part defined through the hub. The slot may extend entirely through the hub whereby serrations in the slot may be engaged by the ratchet arm from either aperture. The aperture of the sleeve may constitute the aperture in the body by virtue of the edge wall formed between said front and back walls being formed by the sleeve, in this case between said three positions.

Preferably, the centre of rotation of the rotate clamp member is equidistant from the sides of the base and the same distance from one of its short sides. In this way, the three positions of the rotate clamp member are one (the second position) centrally between the long sides adjacent a short side of the base, and (the first and third positions) adjacent either long side the same distance up the long side as the rotate clamp is from the centre to either long side in the second position.

It is to be remembered that the body of the docking station of the present invention is preferably itself on the end of a universally adjustable mounting arm (that has various mounting possibilities from sucker-type base for mounting on a windshield to clip-type for grill mounting). The universal joint preferably permits the base to be rotated relative to the mounting arm so that the phone when docked in the station may be arranged in landscape or portrait mode, as may be preferred, regardless of which side or which end of the phone, and wherever along the length of the side, the socket is provided, and whether it is clamped along its length or across its width.

While, in principle, many of the foregoing features of the present invention may be omitted, in practical terms, the present invention is principally concerned with a docking station suitable for a large number of phones where the clamp mechanism incorporates the plug providing electrical connection to the phone. There are three advantages with this: first, the plug being associated with the clamp means that the chances of the plug falling out of the socket is very remote; second, with the plug engaging the phone in a direction perpendicular to the clamp direction, if the clamp direction is horizontal, the plug ensures that the phone cannot slip under the influence of gravity and vibration between the clamp surfaces of the clamps; and third, the wire supplying the plug can be hidden within the arm on which the clamp is mounted, whereby a tidier arrangement is provided.

With this in mind, the invention can in one respect be defined as a docking station for an elongate rectangular mobile device, comprising
  a main body, of generally rectangular outline providing a generally flat base and against which base the mobile device is adapted to lie, in use,
  a first adjustable slide clamp member,
  a second adjustable rotate clamp member having a plug for interconnection with a socket of the mobile device,
  wherein the slide clamp member has a clamp surface and comprises a ratchet arm on the end of which is disposed said clamp surface, and wherein the body comprises first and second apertures, each of which apertures is adapted to receive said ratchet arm to permit sliding movement of said slide clamp member, in a first direction in said first aperture and in a substantially perpendicular second direction in said second aperture, said clamp surface being substantially perpendicular the direction of sliding movement of the slide clamp member, wherein the rotate clamp member has a clamp surface and is rotatably disposed with respect to the body so that it can rotate between two positions, in a first of which the clamp surface is parallel said second direction and in a second of which it is parallel said first direction, wherein the clamp members can be arranged to move towards and away from one another between open and closed positions, to squeeze and release from between said clamp surfaces a mobile device to be docked in the station, and wherein the clamp members are adapted to be positioned in one of at least two orientations with respect to the base, in a first orientation the clamp members moving between said open and closed positions in the first direction substantially parallel said base and a second orientation wherein the clamp members move between said open and closed positions in the second direction substantially parallel said base and substantially perpendicular said first direction, whereby, depending on the location of the socket on a given mobile device, the mobile device can be clamped between said clamp members with the plug engaged with the socket of the device and so that the phone is substantially aligned with the base.

The base may comprise a front wall, a back wall, and means defining a slot associated with each aperture to receive said ratchet arm, which slot may be provided with serrations against which said ratchet arm latches to lock the slide clamp member against retraction from said aperture in any of multiple positions between a first extreme when said clamp members have maximal separation and a second extreme when said clamp members have minimal separation. Again, the term "serrations" implies, but does not require, a fixed interval digital graduation. In fact, serrations could simply comprise a surface against which the ratchet arm bears to prevent movement, for example by friction over an infinite range of positions.

A hub may be disposed between said front and back walls, wherein said rotate clamp member has a sleeve surrounding said hub and is rotatable thereon, an arm of the rotate clamp member extending from said sleeve between said front and rear walls and on the end of which arm said clamp surface is disposed.

The docking station may have the slot associated with at least one aperture defined at least in part through the hub, the sleeve of the rotate clamp member having an aperture on the side thereof opposite the arm and through which the ratchet arm of the slide member is adapted to slide when the rotate arm is in said first position.

Giving yet more options, where some mobile phones may have sockets on either side of the phone, said rotate clamp member may have a third position in which the clamp surface is parallel said first direction and on the opposite side of the base from the first position, and the body may be provided with a third aperture on the other side of the body from said first aperture and adapted to receive said ratchet arm to permit sliding movement of said slide clamp member in said first direction. Of course, the additional options actually relate to the up-down relationship of the phone to the station. That is, the ultimate aim is have the phone as central as possible with respect to the base of the docking station so that the arrangement is neat and symmetrical. However, with the plug being fixed as part of the rotate clamp, which is itself fixed in the direction of clamping, whether this aim can successfully be achieved with multiple phones depends on where the socket is located and the absolute dimensions of the phone. On the whole, when the socket is on the bottom edge of the phone, as it usually is with Apple® devices, the socket tends to be central of the phone. Thus the rotate clamp and slide clamp when in the up-down orientation are preferably central of the base. In which case, the phone is central in a side aspect, but not necessarily in a vertical direction. However, even if the socket is not central, the phone is generally only going to be offset sideways a small amount. When the socket is on the side, it is generally anywhere up the side edge, on either side. Usually, it is not central, but equally not as offset as say, a one third/two thirds position. Of course, any position is possible, on either side of the phone. However, if the base is of the order 100×50 mm and the side-to-side arrangement of the clamps is at a position 25 mm up the long side, then, once the entire body is inverted through 180 degrees, this also provides a 75 mm up the long side position of the clamps, and even if the phone's socket is fairly central, again the offset with respect to the base can be minimised.

As will be recognized by those skilled in the art, the docking station may have Bluetooth® functionality for communication with the phone. It may have a built in microphone and/or a remote microphone for location nearer to a driver of the vehicle. It may have a speaker. It may have buttons on the base, for when the phone is not in the docking station (for example, when it is in its owner's pocket).

BRIEF INTRODUCTION OF THE DRAWINGS

An embodiment of the invention is further described hereinafter, by way of example, with reference to the accompanying drawings, in which.

DETAILED DESCRIPTION OF AN EXAMPLE

Figure 2:
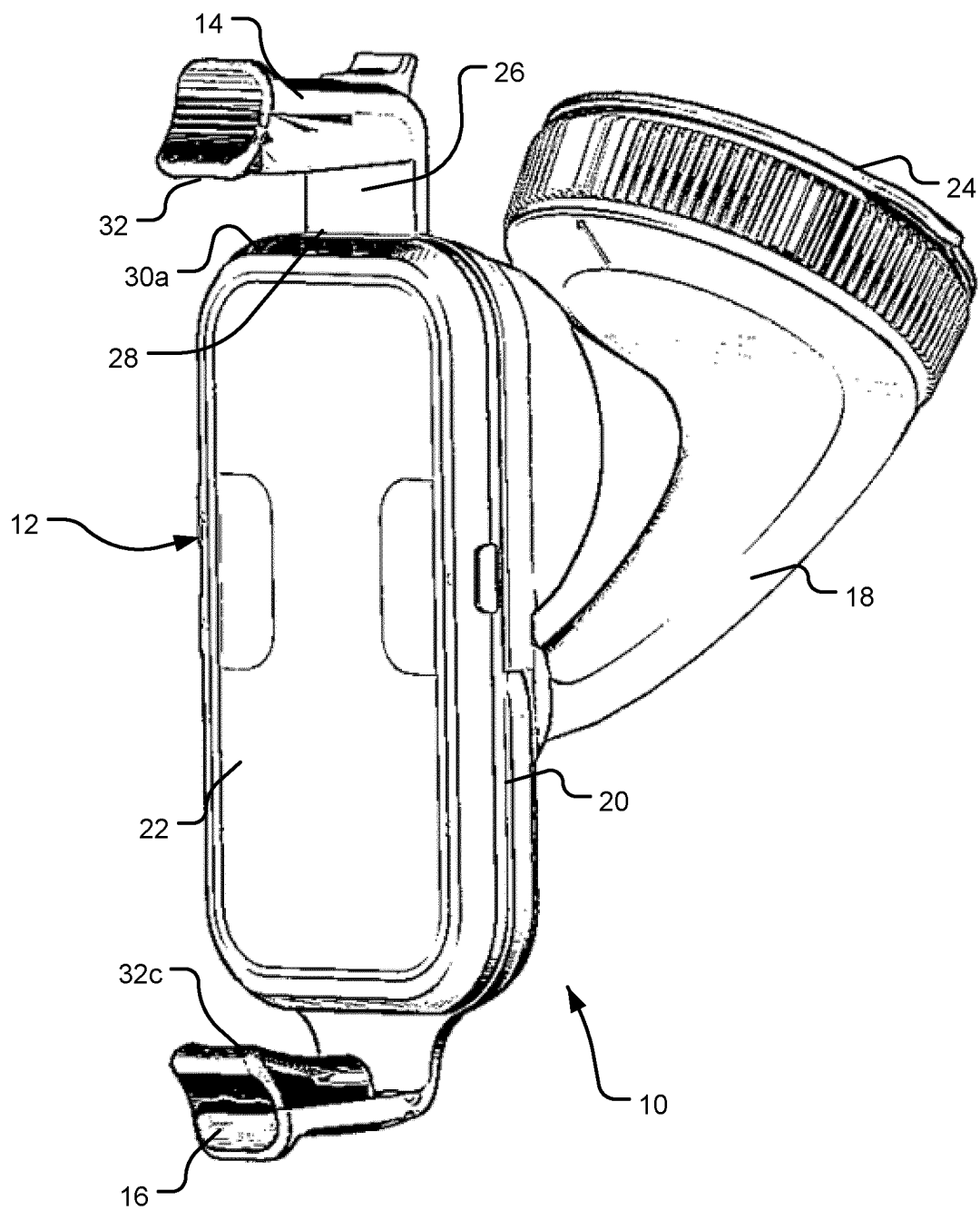
FIG. 2 is a perspective view of the station in which its mounting arm is shown.

In FIG. 2, a docking station 10 in accordance with the present invention comprises a body 12 forming a substantially flat base 22 against which a phone or like mobile device (not shown) is adapted to rest when docked in the station 10. A slide clamp member 14 and a rotate clamp member 16 are used to grip a phone and hold it against the base 22. A mount 18 is fixed through a universal joint (not visible) to a rear wall 20 of the body 12. The universal joint permits the body to be rotated through 360 degrees around an axis substantially perpendicular to the base 22 (in its position shown in FIG. 2). Tilting of the body is also possible, to lesser extents, around other axes.

The mount 18 (in the case shown in FIG. 2) is adapted for mounting to a vehicle windscreen and comprises a suction pad 24 for surface mounting. However, by rotating the mount through 180 degrees (about the axis mentioned above), it also serves for mounting the station 10 on a flat horizontal surface, such as a vehicle dashboard. An alternative mount is also feasible (but not shown) comprising a gripping-type clip, adapted for connection to ventilator grills.

Clamp members 14,16 are disposed opposite one another across the length of the substantially rectangular base 22. A ratchet arm 26 of the slide member 14 enters an aperture 28 in a top edge 30a. A clamp surface 32 is connected to the arm 26 and is arranged perpendicularly with respect to the arm so as to extend beyond the surface of the base 22.

Figure 3:
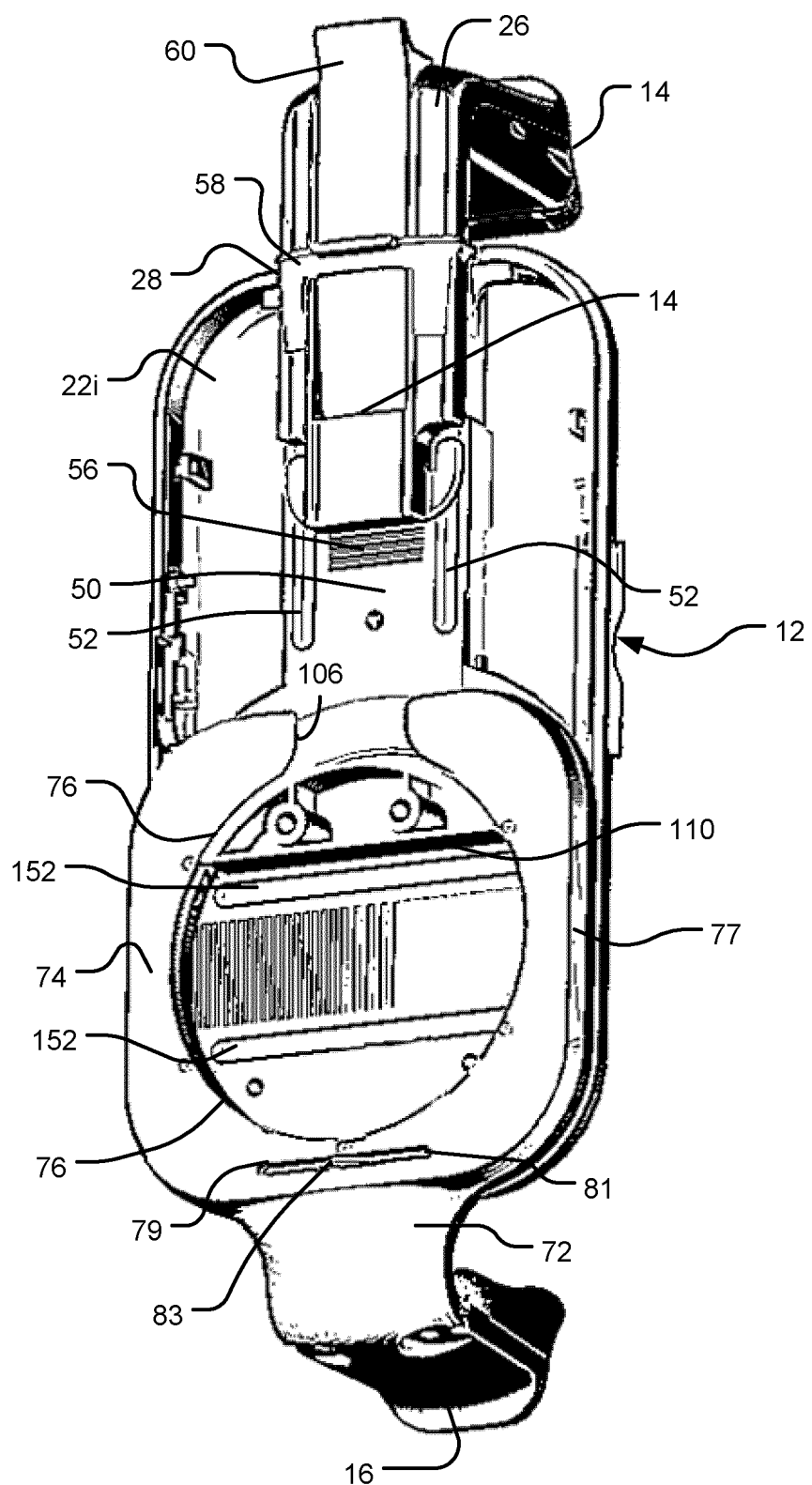
FIG. 3 is a perspective view of the docking station of FIGS. 1 and 2 with a rear wall of a base of the station, and a slot former/mount therein, removed.
Figure 4:
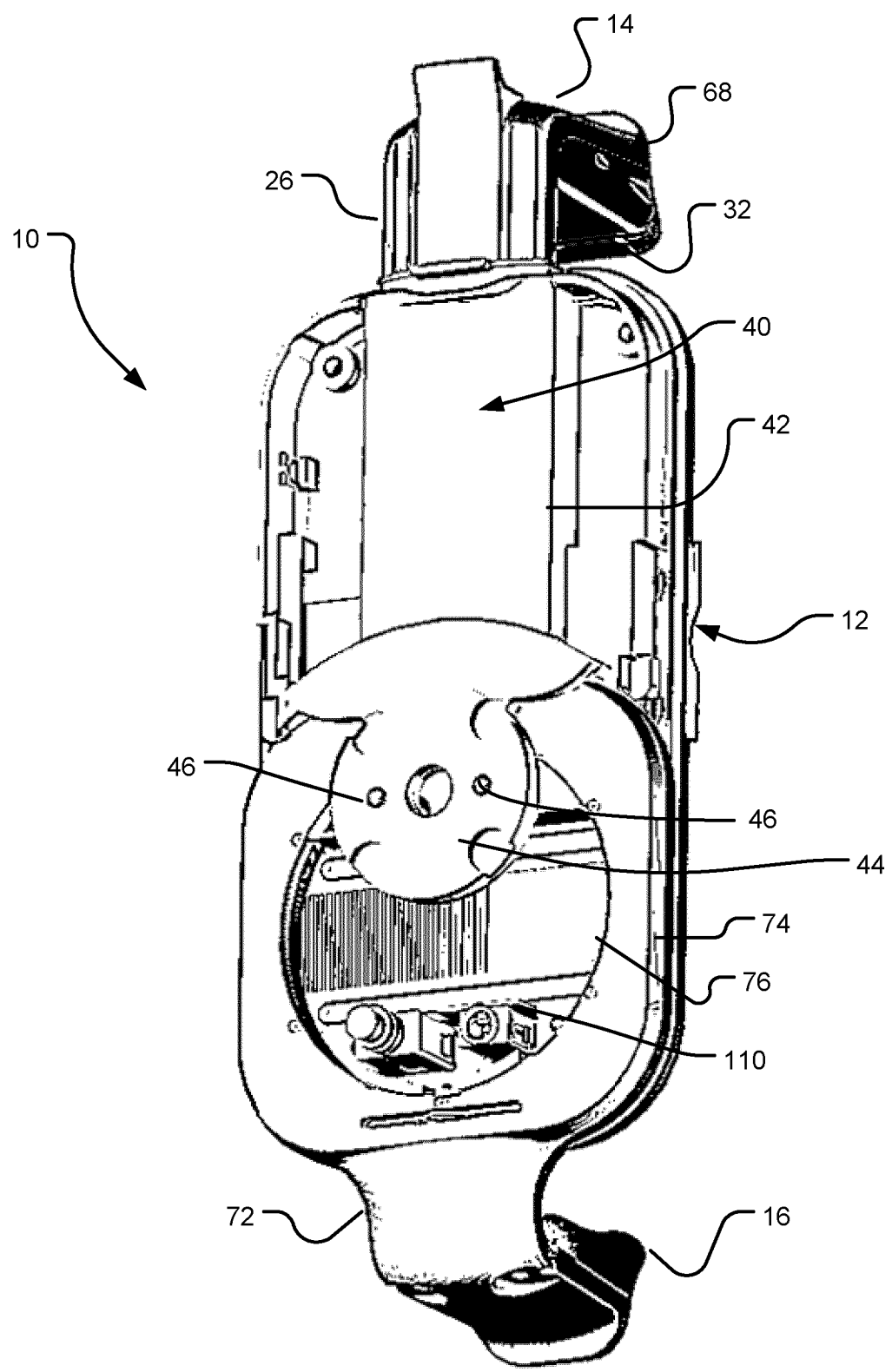
FIG. 4 is a perspective view as FIG. 3 but including the slot former/mount.

Turning to FIG. 4, the back of the dock 10 is shown with its rear wall 20 removed. An inner slot former/mount 40 is visible that has a channel 42 and mount block 44. The latter has screw holes 46 for mounting the universal joint (not shown —80 in FIG. 5a) of the mount 18. In FIG. 3, the slot former/mount 40 is removed and it can be seen that the ratchet arm 26 extends into the body 12 to a substantial depth, within the confines of the channel 42 and a hub plate 50 disposed against the inside 22i of front wall 22. Hub plate 50 includes bearing tracks 52 against which pads 54 of the ratchet arm 26 bear, whereby friction between the ratchet arm 26 and the bore formed between channel 42 and plate 50 is reduced. Between the bearing tracks 52 a series of serrations 56 are formed.

Figure 5A:
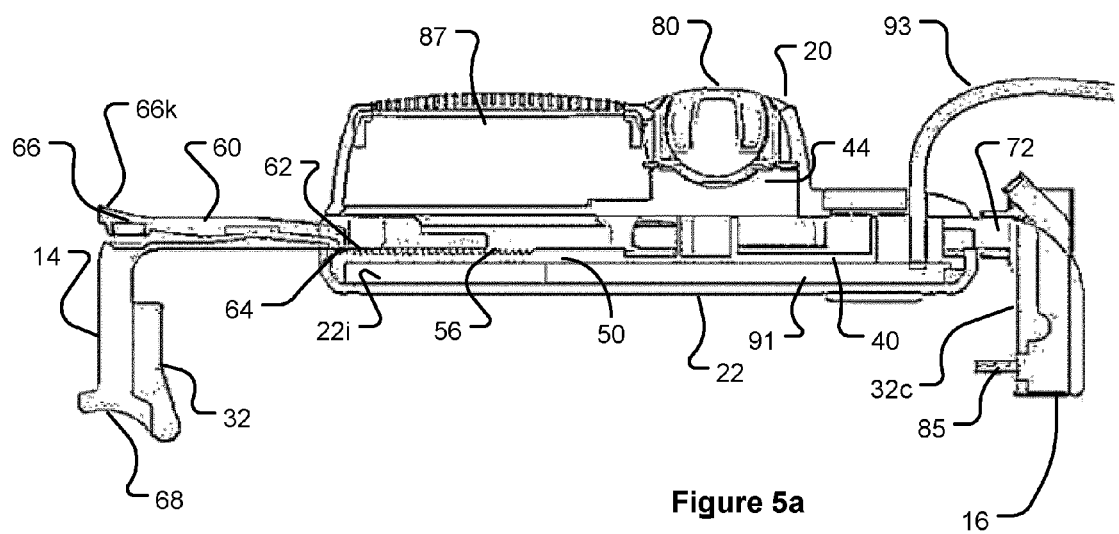
FIGS. 5a and 5b are side sections on the lines A-A and B-B respectively in FIGS. 1a and 1b.
Figure 5B:
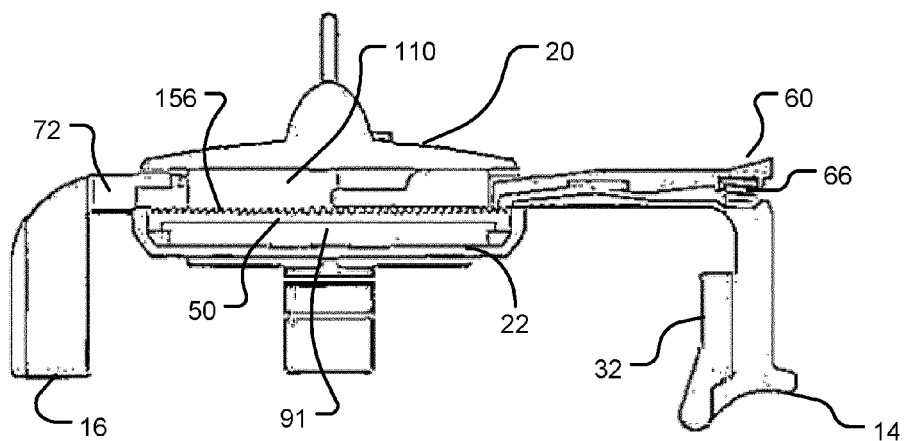

Ratchet arm 26 has a bridge 58 formed across it about half way along its length and which creates a short through-bore along the arm that receives a ratchet lever 60. Turning also to FIG. 5a, a window 62 is also formed in the ratchet arm through which an end tongue 64 of the ratchet lever 60 protrudes. A spring 66 is captured between a knob end 60k of the lever arm and the ratchet arm 26. The spring 66 serves to press the ratchet lever 60 outwardly, against the inside of the bridge 58, thereby pivoting the tongue 64 end of the ratchet arm inwardly through the window 62. On protruding through the window, the tongue 64 presses against the serrations 56 and latches between them. By pressing the knob end 60k against the ratchet arm (possibly using butt 68 of the clamp surface 32 as a counterpoise for finger or thumb) the ratchet lever pivots against the bridge 58 withdrawing the tongue from the window 62 and releasing it from engagement with the serrations 56. When this occurs, the ratchet can move freely along the channel 42.

Rotate clamp member 16 also has a clamp surface 32c, as well as a plug 85. Plug 85 is either an Apple® compatible plug, or a mini- or micro-USB plug. Either would have a flying lead for connection to a vehicle power source, usually the cigar lighter socket. However, it is also proposed (although not a part of the present invention) that the dock includes several connectivity features that require electrical circuits. For example, speaker 87 may be disposed in a space inside the rear cover 20, a microphone 89 may be disposed on the clamp member 16, and Bluetooth® radio connection components may be provided, for example on circuit board 91 sandwiched between front wall 22 and slot former/mount 40. Thus flying lead 93 may connect the circuit board 91 to the cigar plug (not shown), while a separate lead 95 connects the circuit board (and power) to the plug 85 through a separate wire off the rear end of the clamp member 16.

Returning to FIG. 3, the rotate clamp member 16 also has an arm 72 which bisects into a sleeve 74 that extends between front and rear walls 20,22 inside the body 12. It has a circular bore 76 that is rotationally received on part-circular hub elements 76 of hub plate 50. The external profile 77 of the sleeve 74 approximates to the peripheral profile of the body 12 and forms its edge at this lower region of the body 12. A spring clip 79 is disposed in a slot 81 of the arm 72, which spring has a detent lug 83 adapted to latch in dimples (not shown) on the inner side of the rear wall 20. There are two (or three) of these dimples, located at ninety degree intervals around the centre 100 of rotation. The rotate arm 16 is capable of rotation around the hub elements 76 about an axis 100 that is substantially perpendicular to front wall forming the base 22. It is rotatable between at least two, but preferably three, dispositions or orientations.

Figures 1A, 1C:
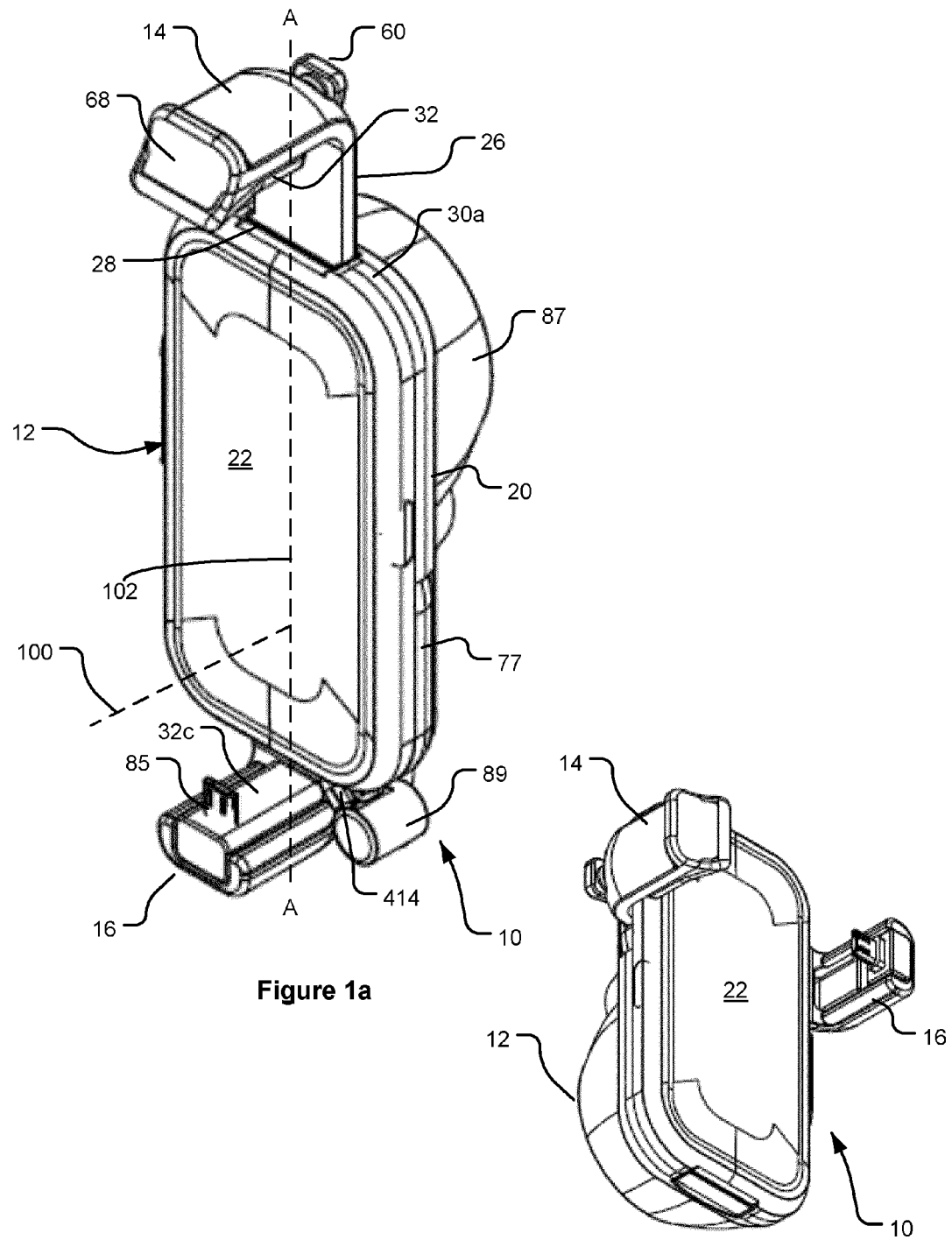
FIGS. 1a, 1b and 1c are perspective views (in reduce scale in the case of FIG. 1c) of a docking station in accordance with the present invention with its clamp members in two different orientations.

In a first, elongate disposition, the rotate clamp member is in the position shown best in FIG. 1a. Also, the slide clamp member is in the aperture 28. Here the direction of freedom of movement of the slide arm is in direction 102, towards and away from the clamp member 16, parallel the long sides of the base 22. The serrations 56 are arranged so that the ratchet arm can move between two extremes, which permit a range of sizes of phone to be clamped between the clamp surfaces 32,32c, of between 99 and 128 mm. This covers a range of typical phone sizes currently on the market.

However, the clamp member 16 can be rotated either clockwise or anticlockwise (clockwise in FIG. 1b) through 90 degrees. This brings a gap 106 between the limbs 74 to the side of the body 12, opposite the clamp surface 32c. This creates an opening (106—see FIG. 1 b) in the side of the body 12 the same dimensions as the aperture 28. The ratchet knob 60 may be depressed to release the tongue 64 from the serrations 56 and the whole ratchet arm 26 withdrawn from the aperture 28. Instead, now, the slide clamp member 14, or rather, its ratchet arm 26, can be inserted in the aperture 106. It is to be noted that the hub plate 50 has channel walls 110 on either side of tracks 152 and between which are further serrations 156. The ratchet arm is able to slide, now along the direction 104 (see FIG. 1 b) whereby the clamp members 14,16 are in their second, lateral orientation in which they can grip the sides of a phone. The slide clamp members permit a range of sizes of phone to be clamped between the clamp surfaces 32,32c, of between 54 and 67 mm. Again, this covers a range of the widths of typical phones currently on the market.

There is a third position of the two clamp members which is simply the reverse of the second position. This is not illustrated. That is, the rotate clamp member is rotated anticlockwise until it occupies the position currently shown occupied by the slide clamp member 14 in FIG. 1 b. In this case, the aperture 106 is also on the opposite side and the slide clamp member 14 (which must be withdrawn from the aperture 106 before the rotate clamp member 16 can be rotated) can be reinserted into the aperture 106, but this time on the other side of the phone.

Figure 1B:
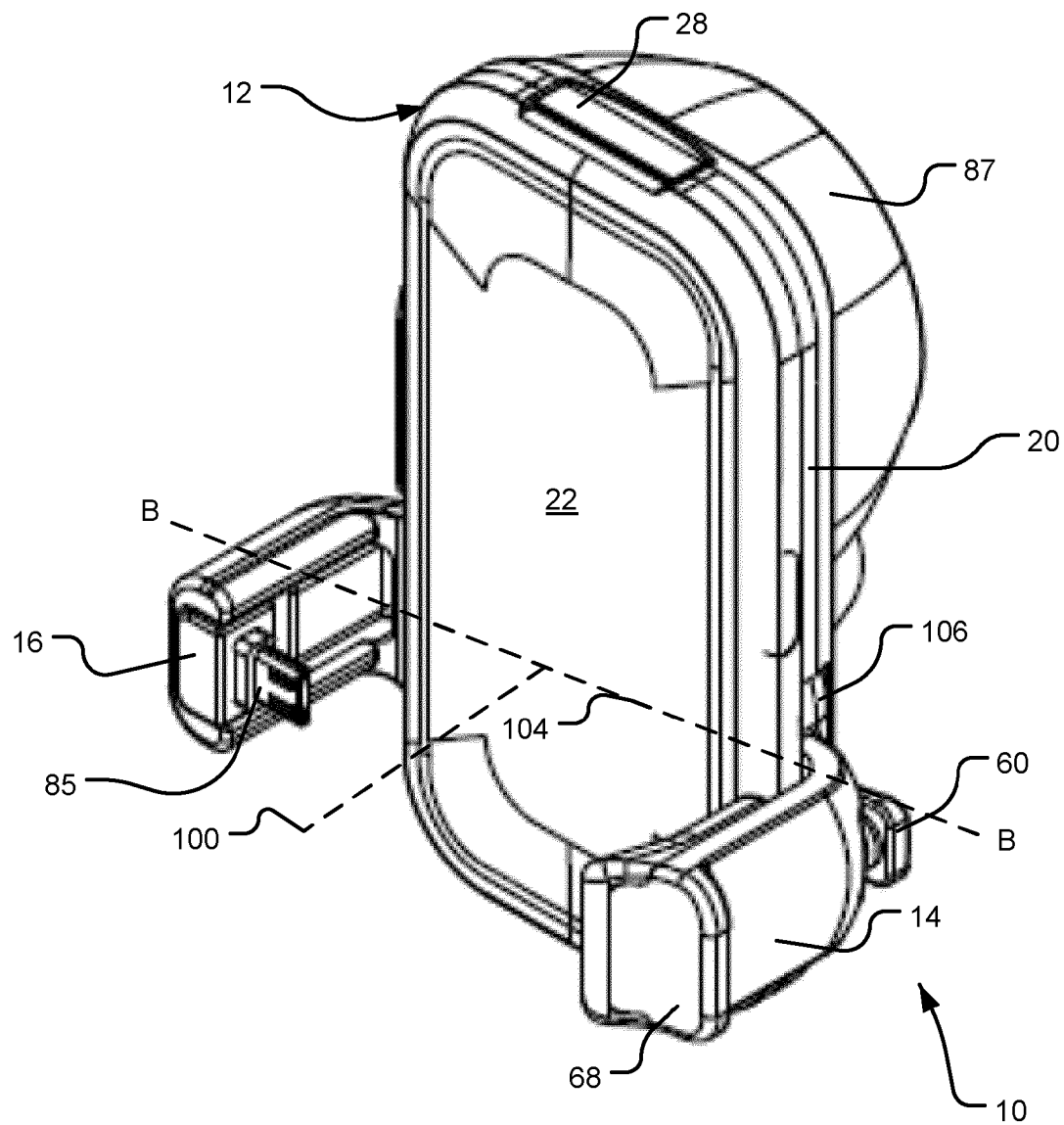

The only purpose in doing this is in the event that the phone to be docked has its socket corresponding with the plug 85 on the right hand side (looking at FIG. 1 b) instead of the left hand side (which would be correct for the FIG. 1b arrangement). Of course, if the socket was not only on the other side (than is appropriate for the FIG. 1 b lateral orientation) but also was nearer the top of the phone than the bottom, then, instead of rotating the rotate clamp member 16 with respect to the body 12, as just described, the whole body 12 is rotated about the mount 18. This then renders the orientation as shown in FIG. 1 c, in which the rotate clamp member is, again, on the right side, but this time towards the top of the base 22, and this may be most appropriate for some makes of phone. Of course, if the socket was in the top left quadrant of a particular phone, not only would the whole body 12 be rotated with respect to the mount, as shown in FIG. 1 c, but also the position of the clamps 14,16 would be reversed, as described above.

Likewise, in the event that the socket in the phone is in its top surface, instead of the bottom, the body 12, in its elongate orientation of the clamp members, may be rotated 180 degrees from the position shown in FIG. 1a.

As can be understood from the foregoing the arrangement of the present invention, particularly when it incorporates the plug in the rotate clamp member, provides a robust and bespoke-looking docking station which is nevertheless adaptable to mount a range of currently available phones.

Throughout the description and claims of this specification, the words "comprise" and "contain" and variations of them mean "including but not limited to", and they are not intended to (and do not) exclude other additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A docking station comprising a main body providing a generally flat base and against which base a mobile device is adapted to lie, in use, and two adjustable clamp members arranged to be capable of being moved towards and away from one another between open and closed positions so as to squeeze and release, from between the two adjustable clamp members, the mobile device to be docked in the station, wherein the clamp members are adapted to be positioned in one of at least two orientations with respect to the base, in a first orientation the clamp members moving between said open and closed positions in a first direction substantially parallel to said base and a second orientation wherein the clamp members move between said open and closed positions in a second direction substantially parallel to said base and substantially perpendicular to said first direction.

2. A docking station as claimed in claim 1, wherein said base is substantially rectangular in outline.

3. A docking station as claimed in claim 2, wherein said rectangular base has two short sides and two long sides and said first direction is substantially parallel to one of said long sides.

4. A docking station as claimed in claim 3, in which the clamp members have a width less than the width of the base and, when moving in said first direction, the clamp members are within the confines of the long sides of the base.

5. A docking station as claimed in claim 4, wherein the clamp members, when moving in said second direction are nearer one short side of the base than the other.

6. A docking station as claimed in claim 1, wherein at least one clamp member is a rotate clamp member, has a clamp surface and is rotatably disposed with respect to the body so that the at least one clamp member can rotate between two positions, in a first of which the clamp surface is parallel to said second direction and in a second of which the clamp surface is parallel to said first direction.

7. A docking station as claimed in claim 6, in which said rotate clamp member has a third position in which the clamp surface is parallel to said first direction and on the opposite side of the base from the first position.

8. A docking station as claimed in claim 6, wherein the base comprises a front wall, a back wall, and a hub disposed between said front and back walls, wherein said rotate clamp member has a sleeve surrounding said hub and is rotatable thereon, an arm of the rotate clamp member extending from said sleeve between said front and rear walls and on the end of which arm said clamp surface is disposed.

9. A docking station as claimed in claim 8, wherein an edge wall is formed between said front and back walls to close the body, the sleeve forming said edge wall between said two positions and conforming to the profile of said front and back walls when in either of said two positions.

10. A docking station as claimed in claim 1, wherein one clamp member is a slide clamp member, has a clamp surface and comprises a ratchet arm on an end of which is disposed said clamp surface, and wherein the body comprises first and second apertures, each of which apertures is adapted to receive said ratchet arm to permit sliding movement of said slide clamp member, in the first aperture in said first direction and in said second aperture in said second direction, said clamp surface being substantially perpendicular to the direction of sliding movement of the slide clamp member.

11. A docking station as claimed in claim 10, in which said body is provided with a third aperture on the other side of the body from said first aperture and adapted to receive said ratchet arm to permit sliding movement of said slide clamp member in said first direction.

12. A docking station as claimed in claim 10, wherein the base comprises a front wall, a back wall, and means defining a slot associated with each aperture to receive said ratchet arm, which slot is provided with serrations against which said ratchet arm latches to lock the slide clamp member against retraction from said aperture in any of multiple positions between a first extreme when said clamp members have maximal separation and a second extreme when said clamp members have minimal separation.

13. A docking station as claimed in claim 12, wherein said ratchet arm comprises a spring-biased knob which, when depressed, releases the latch of the ratchet arm with said serrations to permit free sliding of the ratchet arm in said slot.

14. A docking station as claimed in claim 1, wherein one clamp member is fixed with respect to said first and second directions.

15. A docking station as claimed in claim 14, in which said one clamp member is a rotate clamp member having a clamp surface and is rotatably disposed with respect to the body so that it can rotate between two positions, in a first of which the clamp surface is parallel to said second direction and in a second of which it is parallel to said first direction, and the other clamp member is a slide clamp member having a clamp surface and comprises a ratchet arm on the end of which is disposed said clamp surface, and wherein the body comprises first and second apertures, each of which apertures is adapted to receive said ratchet arm to permit sliding movement of said slide clamp member, in the first aperture in said first direction and in said second aperture in said second direction, said clamp surface being substantially perpendicular to the direction of sliding movement of the slide clamp member.

16. A docking station as claimed in claim 15, wherein the base comprises a front wall, a back wall, and a hub disposed between said front and back walls, wherein said rotate clamp member has a sleeve surrounding said hub and is rotatable thereon, an arm of the rotate clamp member extending from said sleeve between said front and rear walls and on the end of which arm said clamp surface is disposed, and wherein the base further comprises means defining a slot associated with each aperture to receive said ratchet arm, which slot is provided with serrations against which said ratchet arm latches to lock the slide clamp member against retraction from said aperture in any of multiple positions between a first extreme when said clamp members have maximal separation and a second extreme when said clamp members have minimal separation, and in which the slot associated with at least one aperture is defined at least in part through the hub, the sleeve of the rotate clamp member having an aperture on the side thereof opposite the arm and through which the ratchet arm of the slide member is adapted to slide when the rotate arm is in said first position.

17. A docking station as claimed in claim 16, wherein at least one clamp member is a rotate clamp member, has a clamp surface and is rotatably disposed with respect to the body so that it can rotate between two positions, in a first of which the clamp surface is parallel to said second direction and in a second of which it is parallel to said first direction, in which said rotate clamp member has a third position in which the clamp surface is parallel to said first direction and on the opposite side of the base from the first position, and in which the slots associated with said first and third apertures are collinear and each at least in part defined through the hub.

18. A docking station as claimed in claim 16, wherein one clamp member is a slide clamp member, has a clamp surface and comprises a ratchet arm on the end of which is disposed said clamp surface, and wherein the body comprises first and second apertures, each of which apertures is adapted to receive said ratchet arm to permit sliding movement of said slide clamp member, in the first aperture in said first direction and in said second aperture in said second direction, said clamp surface being substantially perpendicular to the direction of sliding movement of the slide clamp member, in which said body is provided with a third aperture on the other side of the body from said first aperture and adapted to receive said ratchet arm to permit sliding movement of said slide clamp member in said first direction, and in which the slots associated with said first and third apertures are collinear and each at least in part defined through the hub.

19. A docking station as claimed in claim 1, in which one of the clamps includes a plug for mating with a socket on a phone to be docked on the station.

20. A docking station for an elongate rectangular mobile device, comprising:
   a main body, of generally rectangular outline providing a generally flat base and against which base the mobile device is adapted to lie, in use;
   a first adjustable slide clamp member; and
   a second adjustable rotate clamp member having a plug for interconnection with a socket of the mobile device,
   wherein the slide clamp member has a clamp surface and comprises a ratchet arm on an end of which is disposed said clamp surface, and wherein the body comprises first and second apertures, each of which apertures is adapted to receive said ratchet arm to permit sliding movement of said slide clamp member, in a first direction in said first aperture and in a substantially perpendicular to a second direction in said second aperture, said clamp surface being substantially perpendicular to the direction of sliding movement of the slide clamp member,
   wherein the rotate clamp member has a clamp surface and is rotatably disposed with respect to the body so that the rotate clamp member can rotate between two positions, in a first of which the clamp surface is parallel to said second direction and in a second of which the clamp surface is parallel to said first direction, wherein the clamp members are arranged to move towards and away from one another between open and closed positions so as to squeeze and release, from between said clamp surfaces, the mobile device to be docked in the station, and
   wherein the clamp members are adapted to be positioned in one of at least two orientations with respect to the base, in a first orientation the clamp members moving between said open and closed positions in the first direction substantially parallel to said base and a second orientation wherein the clamp members move between said open and closed positions in the second direction substantially parallel to said base and substantially perpendicular to said first direction,
   whereby, depending on a location of the socket on the mobile device, the mobile device can be clamped between said clamp members with the plug engaged with the socket of the mobile device and so that the mobile device is aligned with the base.

* * * * *